3,660,392
METHOD FOR PURIFYING TRIS(β-HYDROXY-ALKYL)ISOCYANURATES
Alexander Sadle, Morristown, N.J., assignor to Allied Chemical Corporation, New York, N.Y.
No Drawing. Filed Nov. 12, 1970, Ser. No. 89,067
Int. Cl. C07d 55/38
U.S. Cl. 260—248 NS    2 Claims

ABSTRACT OF THE DISCLOSURE

An improved method for purifying tris(β-hydroxyalkyl)isocyanurates by recrystallizing from an azeotropic mixture of methanol and methyl ethyl ketone.

IMPROVED METHOD FOR PURIFYING TRIS-(β-HYDROXYALKYL)ISOCYANURATES

This invention relates to an improved method of purifying tris(β-hydroxyalkyl)isocyanurates. More particularly, this invention relates to the recrystallization of tris-(β-hydroxyalkyl)isocyanurates utilizing a methanol-methyl ethyl ketone azeotrope as the solvent.

BACKGROUND OF THE INVENTION

Tris(β-hydroxyalkyl)isocyanurates can be prepared by reaction of cyanuric acid and an alkylene oxide in the presence of a basic catalyst as is described in U.S. Pat. 3,088,948. These products can be recrystallized from alkanols, such as methanol and ethanol. Although the melting point and analytical analysis of the resultant recrystallized products indicates them to be of good purity, this method of purification has been found to be less than satisfactory, particularly for certain applications. Tris(β-hydroxyalkyl)isocyanurates are moderately soluble in alkanols, and thus substantial losses occur during recrystallization even at low temperatures. Further, when the tris(β-hydroxyalkyl)isocyanurates are to be employed as starting materials for the preparation of oxazolidones or oxyalkylated products, as are disclosed in copending U.S. application Ser. Nos. 738,851 and 873,690, both in the names of R. L. Formaini and E. D. Little, filed June 21, 1968 and November 3, 1969, respectively, both now abandoned, impurities remaining in the tris(β-hydroxalkyl)isocyanurates interfere with the reactions and result in the formation of inferior yields and contaminated products. Repetition of recrystallization from the known alkanol solvents does not remove the interfering impurities.

Other recrystallization solvents have also been tried, but have various disadvantages. Tris(β-hydroxyalkyl)-isocyanurates have only limited solubility in ketone solvents even at reflux temperatures, and thus unduly large amounts of such solvents are required on a commercial scale.

The use of a mixed solvent for recrystallization is generally unsatisfactory because of the constant changes in the mixture due to vapor losses on heating. This results in a constantly changing solubility both of the product and impurities in the mixture and can lead to impure products and high losses due to high product retention in the filtrate.

SUMMARY OF THE INVENTION

It is an object of the present invention to provide an cyanurates. It is another object to provide a recrystallization solvent which gives improved yields of recrystallized product at room temperature. It is a further object to provide a recrystallization solvent for tris(β-hydroxyalkyl)isocyanurates which will remove impurities that lead to low yields in their reaction to form oxazolidones. It is another object to provide a recrystallization solvent for tris(β-hydroxyalkyl)isocyanurates which will remove impurities that prevent their oxyalkylation with alkylene oxides. Further objects will become apparent from the following detailed description thereof.

According to the present invention, tris(β-hydroxyalkyl)isocyanurates can be recrystallized in high yield at room temperature from an azeotropic mixture of methanol and methyl ethyl ketone. This solvent dissolves surprisingly high amounts of the subjects isocyanurates at reflux temperatures, much higher than does the azeotropic mixture of methanol and acetone, for example, and much greater amounts than would be expected for a mixture containing 70% of methyl ethyl ketone. Furthermore, this azeotrope dissolves much smaller amounts of the product isocyanurate at room temperature or below than does methanol alone. The products recrystallized according to the present process can be oxyalkylated with alkylene oxides in improved yields and give improved yields of oxazolidones.

DETAILED DESCRIPTION OF THE INVENTION

The azeotropic mixture of methanol and methyl ethyl ketone contains about 70% by weight of methanol and has a boiling point of about 63.5° C. The mixture can be readily prepared by distillation of a mixture of the solvents.

According to the present process, tris(β-hydroxyalkyl)-isocyanurate, prepared according to the method described in Example II of U.S. Pat. 3,088,948, is added to the methanol/methyl ethyl ketone azeotrope and heated to dissolve the isocyanurate. The isocyanurates which can be purified according to the present process are tris(β-hydroxyalkyl)isocyanurates wherein the alkyl group has from 2–44 carbon atoms.

The relative amount of solvent employed is not critical, but sufficient solvent is required to dissolve the product to be purified at reflux temperatures. A large excess of solvent is undesirable, since product losses will occur and an undue amount of solvent must be handled. The minimum amount will be readily ascertainable by one skilled in the art, depending on the pressure, etc. Any insoluble impurities present can be removed in conventional manner from the hot solution, as by filtration. As the solution is cooled, the tris(β-hydroxyalkyl)isocyanurates will precipitate and can be recovered by filtration. The filtrate, containing dissolved tris(β-hydroxyalkyl)isocyanurates and impurities, can be recycled. Preferably, the filtrate is distilled prior to reuse. A small amount of excess ketone is generally added prior to distillation. As is known, a nonsolvent for the tris(β-hydroxyalkyl)isocyanurates can also be added to the filtrate prior to distillation to precipitate additional quantities of dissolved solids.

The exact nature of the impurities removed from tris-(β-hydroxyalkyl)isocyanurates by the present process is unknown; for example, the infrared spectra of tris(2-hydroxyethyl)isocyanurate recrystallized from the azeotropic solution of the present invention does not differ substantially from that of tris(2-hydroxyethyl)isocyanurate recrystallized from methanol. However it is known that the impurities are water insoluble since tris(2-hydroxyethyl)isocyanurate recrystallized twice from methanol forms a cloudy solution in water, whereas tris(2-hydroxyethyl)isocyanurate recrystallized once from methanol and once from the azeotropic solvent of the present invention forms a clear solution in water.

The invention will be further illustrated by the following examples, although it is to be understood that the invention is not meant to be limited to the details described therein. In the examples, all parts are by weight.

Example I

An azeotropic mixture of methanol and methyl ethyl ketone was prepared by charging 2100 parts of methanol and 1300 parts of methyl ethyl ketone to a distillation apparatus. The distillate boiling at 63.5° C. was collected.

1000 parts of tris(2-hydroxyethyl)isocyanurate which had been recrystallized once with methanol was slurried with 2000 parts of the azeotropic mixture prepared above and stirred while heating to reflux. The resultant solution was filtered hot and allowed to cool to room temperature while stirring.

671 parts of solid tris(2-hydroxyethyl)isocyanurate were recovered by filtration. An additional 120 parts of the recrystallized solid were recovered after cooling the filtrate to 0° C.

Example II

A comparison was made between tris(2-hydroxyethyl)-isocyanurate recrystallized according to the procedure of Example I and tris(2-hydroxyethyl)isocyanurate recrystallized once with methanol in the preparation of 2-oxazolidone according to the following procedure:

A reaction vessel fitted with a water cooled receiver was immersed in an oil bath and temperature was increased to 160° C. Maintaining the temperature between 160–210° C., tris(2-hydroxyethyl)isocyanurate was charged to the vessel and the pressure reduced to 1–5 mm. 2-oxazolidone began to form after a few minutes and was collected in the receiver. Additional tris(2-hydroxyethyl)isocyanurate was added from time to time as required to maintain the level of the molten starting material in the reaction vessel.

The reaction using tris(2-hydroxyethyl)isocyanurate recrystallized according to Example I proceeded smoothly for two days, was stopped once overnight and restarted. The residue in the reaction vessel had a basic pH.

The reaction using tris(2-hydroxyethyl)isocyanurate recrystallized from methanol alone was continued for only three hours when the pressure began to rise, production of 2-oxazolidone slowed down and the formation of amines was noted. The residue in the reaction vessel had an acid pH.

Example III

A comparison was made between tris(2-hydroxyethyl)-isocyanurate recrystallized according to the procedure of Example I and of tris(2-hydroxyethyl)isocyanurate recrystallized twice with methanol in an epoxylation reaction according to the following procedure:

Part A.—312 parts of tris(2-hydroxyethyl)isocyanurate recrystallized from methanol, 0.18 part of sulfuric acid and 3.5 parts of cyanuric acid were charged to a pressure vessel and sealed. Propylene oxide was added in increments over a period of one hour, as required to maintain the pressure above about 50 p.s.i.g. The product was a light yellow liquid having a pH of 8. It was confirmed as 2-oxazolidone by infrared analysis.

Part B.—The procedure of Part A was repeated except utilizing tris(2-hydroxyethyl)isocyanurate recrystallized according to Example I. The product was a viscous liquid having a light yellow color and a neutral pH. The product was confirmed as an oxyalkylated product having the formula:

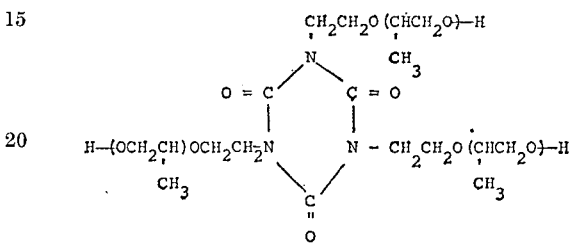

Part C.—The procedure of Part A was repeated except utilizing tris(2-hydroxyethyl)isocyanurate recrystallized twice from methanol. The principal product was the same as that of Part B, but it was contaminated, as evidenced by a dark amber color and a pH of 8.

I claim:

1. In the process of purifying tris($\beta$-hydroxyalkyl)isocyanurates wherein the alkyl group has 2–4 carbon atoms by recrystallization from a solvent, the improvement which comprises utilizing an azeotropic mixture of methanol and methyl ethyl ketone having a boiling point of about 63.5° C. as the recrystallization solvent.

2. The process of claim 1 wherein the tris($\beta$-hydroxyalkyl)isocyanurate is tris(2-hydroxyethyl)isocyanurate.

References Cited
UNITED STATES PATENTS 3,410,854  11/1968  MacGregor _____ 260—248

JOHN M. FORD, Primary Examiner